Figure 1:
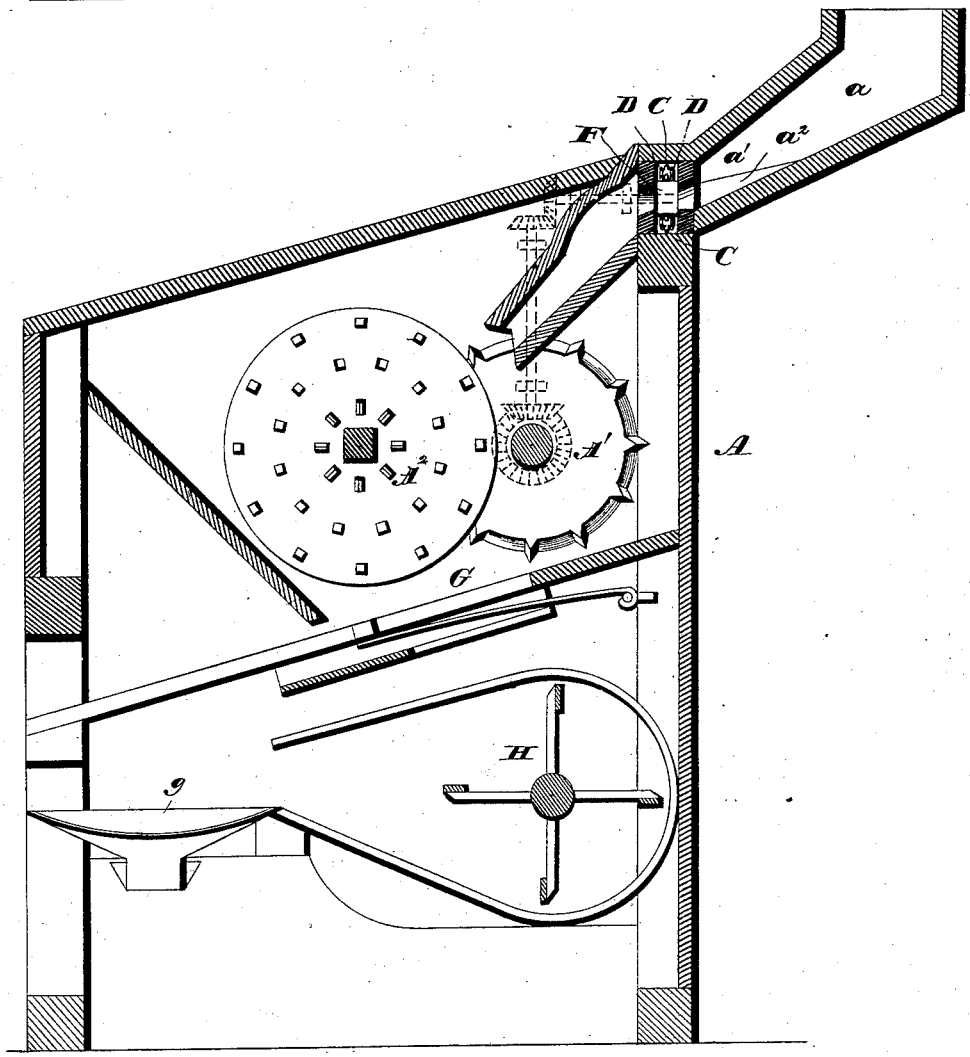

(No Model.) 2 Sheets—Sheet 1.

W. W. WILLS.
HUSK CUTTING ATTACHMENT FOR CORN SHELLERS.

No. 363,712. Patented May 24, 1887.

WITNESSES
G. S. Elliott
E. W. Johnson

William W Wills.
INVENTOR
Attorney

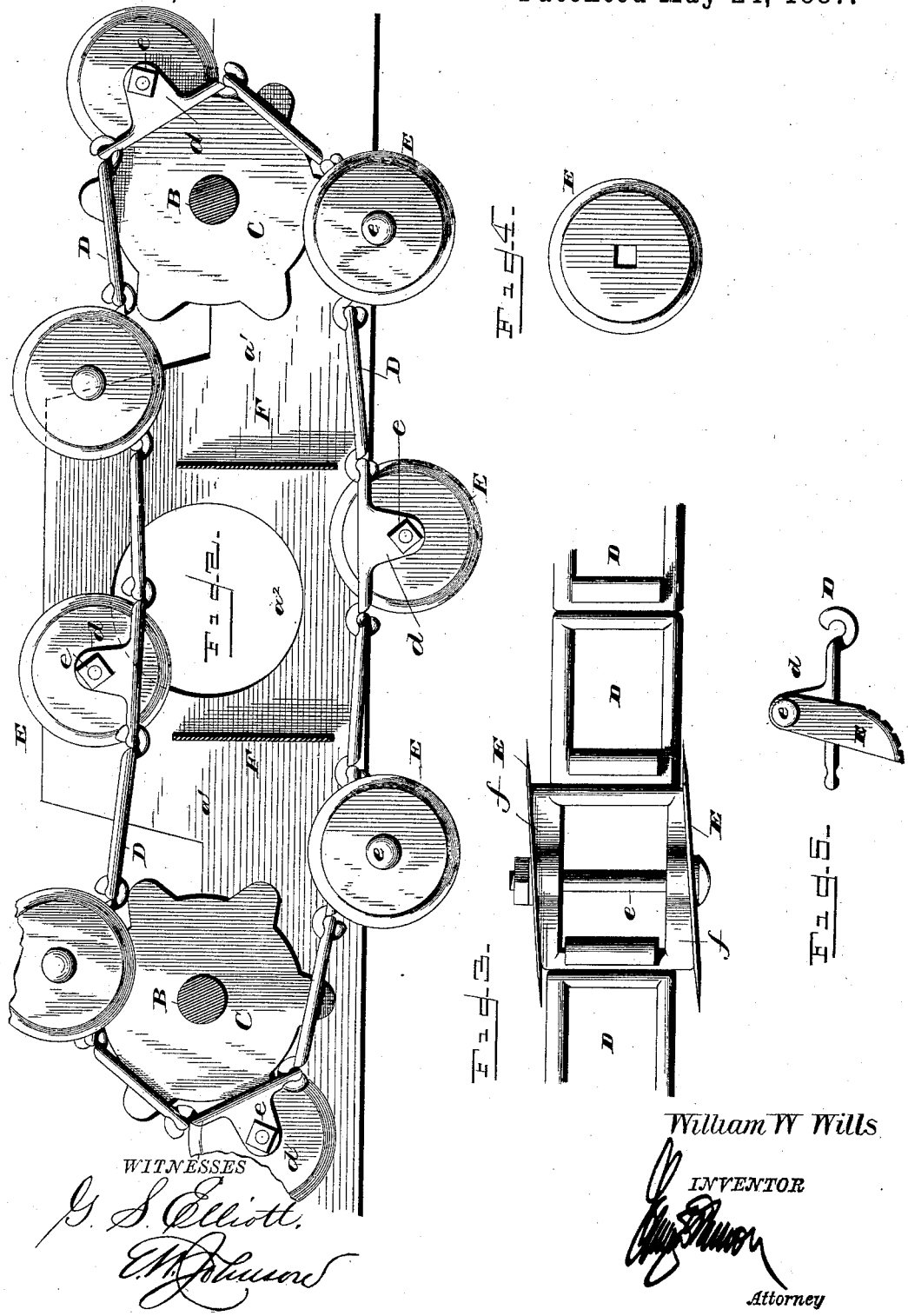

UNITED STATES PATENT OFFICE.

WILLIAM WALLACE WILLS, OF PALMYRA, VIRGINIA.

HUSK-CUTTING ATTACHMENT FOR CORN-SHELLERS.

SPECIFICATION forming part of Letters Patent No. 363,712, dated May 24, 1887.

Application filed October 21, 1886. Serial No. 216,851. (No model.)

*To all whom it may concern:*

Be it known that I, WILLIAM WALLACE WILLS, a citizen of the United States of America, residing at Palmyra, in the county of Fluvanna and State of Virginia, have invented certain new and useful Improvements in Husk-Cutting Attachments for Corn-Shellers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in husking devices for corn-shellers, the object of my invention being to provide a simple, cheap, and effective means for separating or cutting the husk which incloses the ear of corn, so that it will be readily removed by the shelling devices; and to this end my invention consists in an attachment which is applicable to corn-shellers, the same being adapted to be placed in the feeding-spout thereof, so that the husks will be cut into small pieces, said attachment consisting, essentially, of an endless chain having knives or cutters attached thereto, as will be hereinafter fully set forth, and pointed out in the claims.

In the accompanying drawings, which illustrate my invention, Figure 1 is a sectional view of a corn-sheller, showing my invention applied thereto. Fig. 2 is a longitudinal sectional view of my improvement, showing the same detached from a corn-sheller. Fig. 3 is a plan view of a portion of the endless chain, showing circular cutters attached thereto. Fig. 4 is a side view of one of the cutters detached, and Fig. 5 is a side view of a cutter or modification of my invention.

A refers to the corn-sheller, which may be of ordinary construction, said sheller being preferably provided with feed and picker wheels A' A², or other shelling apparatus, a reciprocating screen, G, and a blast-fan, H.

Within the spout $a$ of the corn-sheller, so as to occupy a position transversely with the same, is located my improved husking device, which consists, essentially, of shafts B B, upon which are rigidly secured sprocket-wheels C C, these sprocket-wheels being connected to each other by an endless chain, D, the alternate links of which are provided with projecting ears $d\ d$, which serve as supports for the knives or cutters E, which are secured removably thereto by means of bolts $e$.

The cutters, as shown in Fig. 2, may be arranged on alternate opposite sides of the chain, or each link may be provided with a pair of cutters, as shown in Fig. 3; and the links to which the cutters are attached are provided with inclined sides, as shown at $f$, so that the cutters will be located at an angle with the chain.

Instead of employing circular cutters, I may use a blade, as shown in Fig. 5, and, if desirable, these blades or circular cutters may have serrated edges.

One of the shafts to which one of the sprocket-wheels is attached extends outwardly, and is provided with a beveled cog-wheel, which engages with a cog-wheel attached to a shaft which has on its opposite end a larger beveled cog-wheel, which is driven from any suitable shaft of the corn-sheller, the gearing being so arranged as to drive the chain carrying the cutters at a high rate of speed.

The frame $a'$, which supports the endless chain and sprocket-wheels, is provided adjacent to the opening $a^2$, through which the ear of corn passes, with partition-boards F, which will prevent the ear of corn being carried toward either of the sprocket-wheels.

The operation of my invention is as follows: When the ear of corn, with the husk thereon, is placed in the spout $a$, which is inclined, the cutters, which are carried by the endless chain, which revolves at a high rate of speed, come in contact with the husk on the ear of corn so as to sever or cut the same, so that the husks will be removed therefrom when the ear of corn reaches the shelling-disks, which not only remove the grains therefrom, but also the husk. The husk, which is cut in small pieces, falling upon the screen G, is carried to a suitable receptacle or falls upon the ground, while the corn passes through said screen and falls into a suitable trough, $g$, and while falling is subjected to a blast, which will remove any particles of husk therefrom which may pass through the screen. The husks, when removed, are in a condition to be fed to stock as fodder, and at the same operation of husking the shelling is performed.

By employing an endless chain with cutters thereon instead of rigid cutters, and placing the same at an angle, several decided advantages are gained, as by allowing the chain a certain amount of play the cutters will only sever the husk and will not injure the grain, as the ear of corn merely rests upon the lower cutters, while the weight of the upper portion of the chain is sufficient to sever the husk and is not sufficient to injure the grain, and by placing the cutters at an angle the ear of corn is assisted in its downward movement toward the shelling mechanism.

The attachment hereinbefore described may be applied to corn-shellers having a series of spouts, and in such a case it is only necessary to use a single chain with cutters attached thereto.

By providing the circular disks and attaching them rigidly to the chain, when the cutting-edges become dulled, said disk may be turned so as to present a new edge to the husk.

I claim—

1. In a device for husking or cutting the husks of ears of corn, the combination of the sprocket-wheels, an endless chain carrying cutters, and a frame provided with an opening through which the ear of corn is passed, substantially as and for the purpose set forth.

2. The combination, substantially as described, of a corn sheller provided with a feed-spout, and a husk-cutting mechanism consisting of sprocket-wheels arranged on either side of the feed-spout, and an endless chain provided with cutters adapted to travel across the feed-spout.

3. The combination, with a corn-sheller provided with a feed-spout, of a transverse frame intersecting said feed-spout and provided with an opening and partitions on either side of said opening, and a husk-cutting mechanism supported in the transverse frame, the same consisting of a suitably-driven chain having cutters attached thereto, substantially as described.

4. The combination, substantially as described, of a corn-sheller provided with a feed-opening, and a husk-cutting device consisting of sprocket-wheels, an endless chain mounted upon said wheels to travel across the feed-opening, and cutters secured to the chain at an angle to the line of motion.

5. In a husk-cutting device for corn-shellers, the combination of a suitable supporting-frame having sprocket-wheels journaled therein, and having an opening, through which the ear of corn is passed, and an endless chain provided with cutters which project within the inner surface of the chain, substantially as and for the purpose set forth.

6. The combination, with the husk-cutting device, consisting, essentially, of sprocket-wheels and a chain provided with cutters, of a shelling mechanism, a screen for separating the corn from the husks, and a blast-fan, substantially as and for the purpose set forth.

In testimony whereof I affix my signature in presence of two witnesses.

WILLIAM WALLACE WILLS.

Witnesses:
JAMES K. GALT,
W. O. THOMAS.